(No Model.) 5 Sheets—Sheet 1.

O. M. MORSE.
SEPARATING MACHINE.

No. 452,580. Patented May 19, 1891.

Witnesses:
Emil Neuhart
F. C. Geyer

O. M. Morse, Inventor.
By Wilhelm Bonner
Attorneys.

(No Model.)  5 Sheets—Sheet 2.

O. M. MORSE.
SEPARATING MACHINE.

No. 452,580.  Patented May 19, 1891.

Witnesses:
Emil Neuhart
F. C. Geyer

O. M. Morse, Inventor.
By Wilhelm Bonner
Attorneys.

(No Model.) 5 Sheets—Sheet 3.
O. M. MORSE.
SEPARATING MACHINE.

No. 452,580. Patented May 19, 1891.

Witnesses:
Theo. L. Popp.
G. Wilhelm.

O. M. Morse Inventor.
By Wilhelm Bonner
Attorneys (No Model.) 5 Sheets—Sheet 4.

O. M. MORSE.
SEPARATING MACHINE.

No. 452,580. Patented May 19, 1891.

Witnesses:
Theo. L. Popp.
Emil Neuhart

O. M. Morse Inventor.
By Wilhelm Bonner
Attorneys.

(No Model.) 5 Sheets—Sheet 5.

O. M. MORSE.
SEPARATING MACHINE.

No. 452,580. Patented May 19, 1891.

UNITED STATES PATENT OFFICE.

ORVILLE M. MORSE, OF JACKSON, MICHIGAN.

SEPARATING-MACHINE.

SPECIFICATION forming part of Letters Patent No. 452,580, dated May 19, 1891.

Application filed October 29, 1890. Serial No. 369,704. (No model.)

*To all whom it may concern:*

Be it known that I, ORVILLE M. MORSE, a citizen of the United States, residing at Jackson, in the county of Jackson and State of Michigan, have invented new and useful Improvements in Separating-Machines, of which the following is a specification.

This invention relates to that class of separators which consist, essentially, of a separating-chamber, through which an air-current ascends, whereby the light material is separated from the heavy and removed, and a settling-chamber or dust-collector, in which the dust-laden air-current descends, and in which the light material is deposited, while the air is returned to the separating-chamber, so that a circulation of air is maintained through the separating-chamber and the dust-collector.

The object of this construction is to produce a simple, convenient, and efficient separating-machine of this kind.

Figure 1:
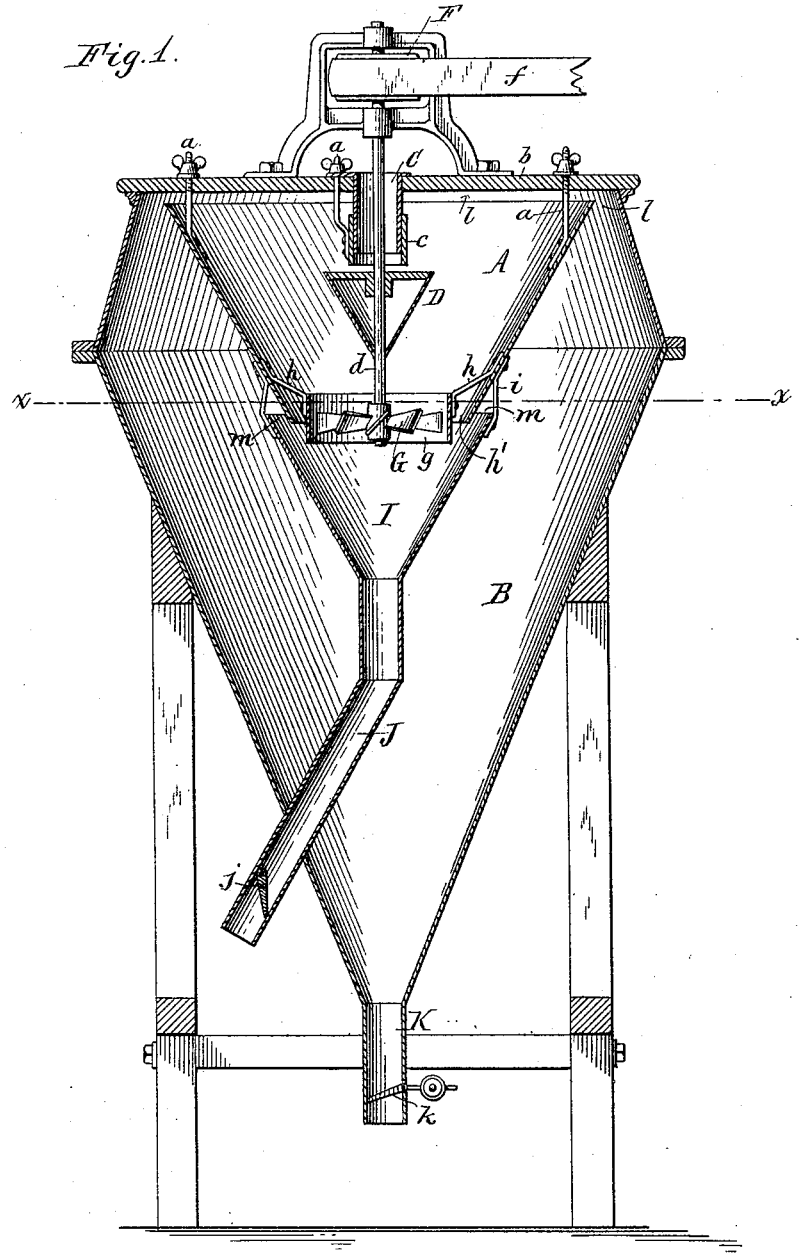
Figure 2:
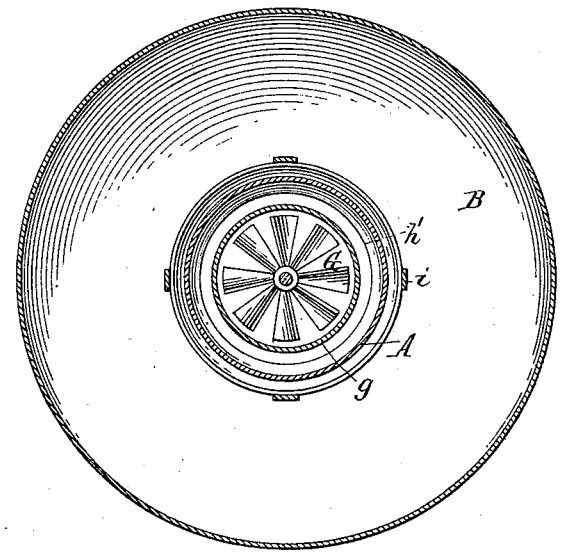
Figure 3:
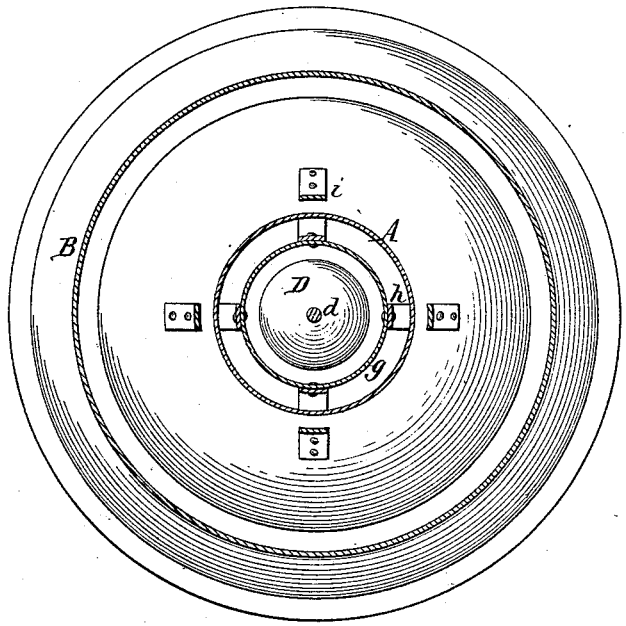
Figure 4:
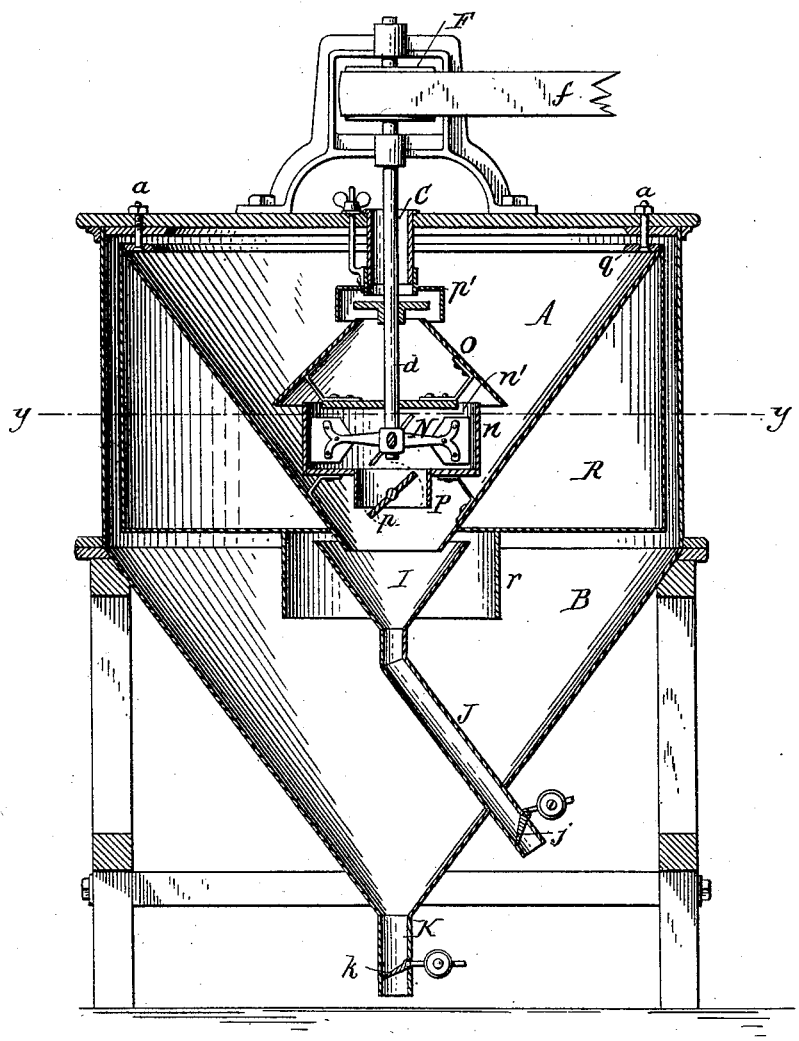
Figure 5:
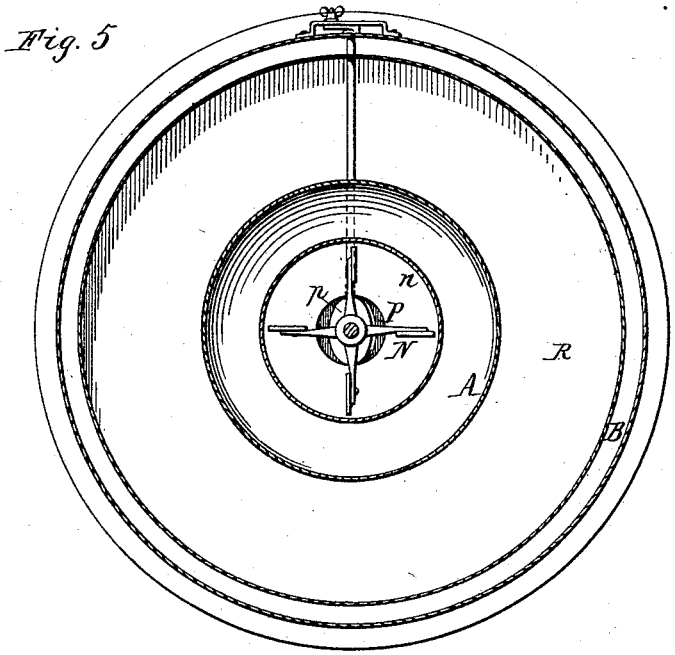
Figure 6:
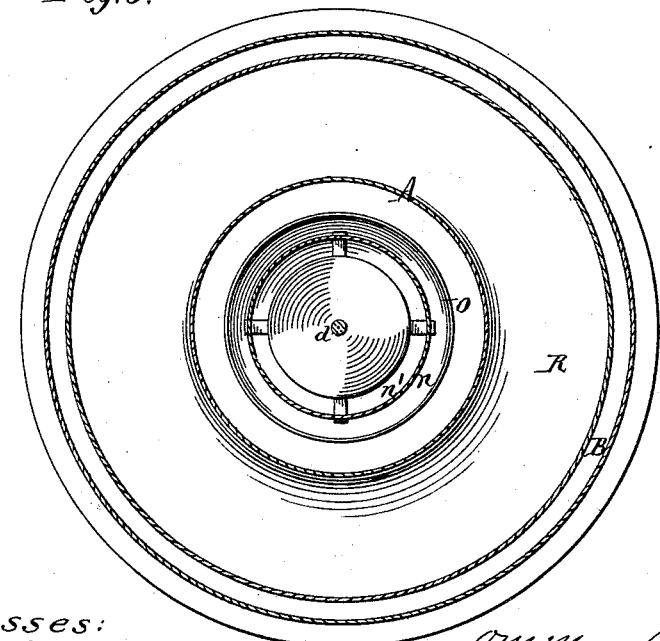
Figure 7:
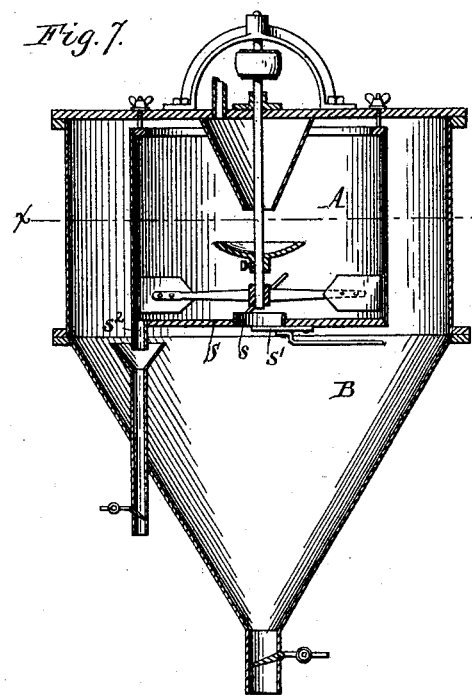
Figure 9:
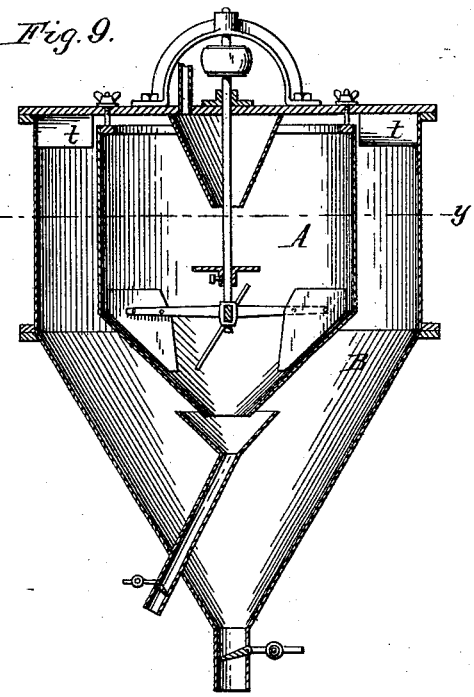
Figure 8:
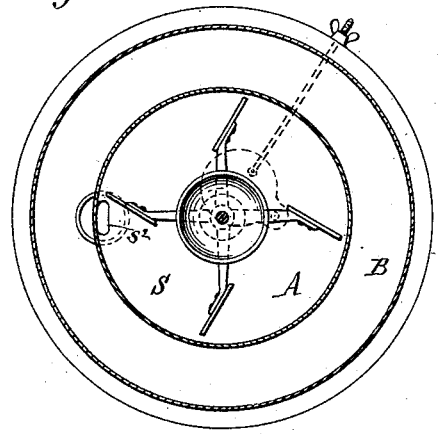
Figure 10:
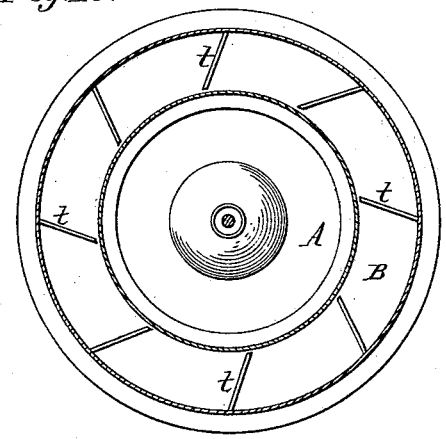

In the accompanying drawings, consisting of five sheets, Figure 1 is a sectional elevation of my improved separating-machine. Fig. 2 is a horizontal section in line $x\,x$, Fig. 1, looking down. Fig. 3 is a horizontal section in line $x\,x$, Fig. 1, looking up. Fig. 4 is a sectional elevation showing a modified construction of my improved separating-machine. Fig. 5 is a horizontal section in line $y\,y$, Fig. 4, looking down. Fig. 6 is a horizontal section in line $y\,y$, Fig. 4, looking up. Fig. 7 is a sectional elevation of another modification of my improved machine. Fig. 8 is a cross-section in line $x\,x$, Fig. 7. Fig. 9 is a sectional elevation of another modification of my improved machine. Fig. 10 is a cross-section in line $y\,y$, Fig. 9.

Like letters of reference refer to like parts in the several figures.

In Figs. 1, 2, and 3, A represents the separating-chamber, which is suspended by screw-bolts $a$ from the top plate $b$ of the inclosing settling-chamber or dust-collector B.

C represents the feed-pipe, which is secured centrally in the top plate $b$, from which it depends into the separating-chamber A, where it is provided with an adjustable sleeve $c$.

D represents the rotating feed-disk, which is arranged below the feed-pipe and secured to a vertical shaft $d$. The latter is rotated by a belt $f$, running around a pulley F at the upper end of the shaft, or by any other suitable means.

G represents a fan secured horizontally to the lower end of the shaft $d$ and provided with oblique blades, whereby the air is caused to move upwardly. $g$ is a sleeve or tubular casing, which surrounds the fan and is supported within the lower contracted portion of the separating-chamber by arms $h$. This sleeve is somewhat smaller in diameter than the lower end of the separating-chamber, so that an annular passage $h'$ is formed between it and the lower end of the separating-chamber, through which the heavy material descends.

I is a receiving-hopper arranged below the contracted lower portion of the separating-chamber and made somewhat larger at its top than the lower end of the separating-chamber. The hopper is supported from the separating-chamber by arms $i$.

J is the discharge-spout of the receiving-hopper, which extends laterally through the side of the dust-collector, and is provided with an automatic valve $j$, which prevents ingress of air.

The dust-collector which incloses the separating-chamber and the receiving-hopper is composed of a short upper portion, which tapers upwardly and a lower main portion which tapers downwardly, and which is provided at its lower end with a discharge-spout K, having an automatic valve $k$.

The machine is particularly useful for purifying middlings, but may be employed for other separating operations. The middlings pass from the feed-pipe upon the rotating feed-disk, by which they are scattered in the separating-chamber and thrown against the downwardly-tapering peripheral wall of the latter. The light impurities are separated from the heavy middlings by the air-current which flows upwardly through the separating-chamber and pass with the air-current upwardly through the separating-chamber and over the top edge thereof, which is separated from the top plate by a space or opening $l$. This opening can be increased or reduced by adjusting the separating-chamber up and down by means of the screw-bolts, whereby the force of the air-current can be regulated. The dust-laden air passes through the space $l$ into the inclosing dust-collector, in which the air-current is weakened by diffusing itself in an enlarged space and in which the dust is deposited. The air passes through the annular opening $m$ between the lower edge of the separating-chamber and the receiving-hopper, and the bulk of the air is drawn into the fan while a portion of the air passes upwardly through the annular opening between the lower edge of the separating-chamber and the sleeve surrounding the fan. The heavy middlings which escape from the lower end of the separating-chamber descend first through the air-current, which ascends between the separating-chamber and the fan-casing, and then through the air-current which passes to the fan below the sleeve, thereby affecting a further separation of any light impurities which may be commingled with the middlings. The latter are collected in the receiving-hopper and discharged through the spout thereof.

In the modified construction of the machine represented in Figs. 4, 5, and 6, the fan N, secured to the lower end of the shaft, is surrounded by a casing $n$, which has in its top an annular peripheral outlet $n'$. The casing is surmounted by a conical hood O, which is somewhat larger at the base than the fan-casing and smaller at the top than the feed-disk, so that the material falls from the feed-disk upon the hood and is carried by the latter beyond the upper edge of the fan-casing. The bottom of the fan-casing is provided with a central inlet-tube P, which contains a valve or damper $p$. The feed-disk may be surmounted by a hood $p'$, which is attached to the adjustable portion of the feed-pipe and which deflects the material downwardly upon the hood O. In passing from the feed-disk to the hood the material passes through the air-current escaping from the contracted upper end of the hood. In descending from the lower end of the hood to the wall of the separating-chamber the material passes through the air-current which flows upwardly around the lower edge of the hood. The air-current which issues from the peripheral opening of the fan-case passes partly through the top of the hood and partly around the lower edge thereof. In passing from the lower edge of the separating-chamber to the receiving-hopper the material descends through the air-current which is drawn to the fan, so that the material is subjected three times to the action of an air-current in passing from the feed-disk to the receiving-hopper. The upper edge of the separating-chamber is provided with an inwardly-projecting flange $q$, to which the adjusting-bolts are attached and which retards the upward movement of the light dust and prevents heavy particles from being carried over into the dust-collector. The upper portion of the dust-collector is cylindrical and the separating-chamber may be surrounded by a cylindrical shell R, which is closed at the bottom and reduces the dead-space in the cylindrical portion of the dust-collector. This shell is provided with a depending collar $r$, which surrounds the lower end of the separating-chamber and compels the dust-laden air to enter the lower tapering portion of the dust-collector before the air can return to the separating-chamber.

The separating-chamber is preferably made downwardly tapering and the fan is arranged in the lower contracted portion of the separating-chamber, as represented in Figs. 1 and 4, whereby the air-current is rendered strongest in the lower portion, where the material under treatment is densest, and becomes weaker or more diffused in the upper portion, where the material is more scattered or divided, whereby the force of the air-current is better proportioned to the requirements of the material, and the liability of driving heavy material into the dust-collector is reduced.

The fan is so constructed and incased in the machines represented in Figs. 1 and 4 that the whirling of the air in the separating-chamber is practically avoided, or at least so reduced that it has no perceptible effect in retarding the descent of the heavy middlings through the separating-chamber and the movement of the fine dust to the upper or large end of the separating-chamber, which movement of the separated material would be seriously interfered with by centrifugal action, as such action would tend to drive the heavy material to the large end of the separating-chamber and sweep the light dust toward the small end.

In the modified construction of the machine represented in Figs. 7 and 8 the separating-chamber is made cylindrical and has a flat bottom S, which is provided at its middle with an air-inlet opening $s$, controlled by a valve $s'$, and at its periphery with a discharge-opening $s^2$ for the heavy purified material. In the modified construction of the machine represented in Figs. 9 and 10 the separating-chamber is composed of an upper cylindrical portion and a lower tapering portion. In both of these modifications the fan-casing is dispensed with and the material is delivered from the feed-disk between the fan-blades. The whirling of the air in the dust-collector can be prevented by vertical wind-breaks or partitions $t$, arranged between the upper portions of the dust-collector and separating-chamber.

The modifications represented in Figs. 7 to 10 do not possess all the advantages which are found in the constructions represented in Figs. 1 to 6, and are therefore less desirable.

I claim as my invention—

1. The combination, with the inclosing dust-collector, of a separating-chamber arranged within the dust-collector and communicating therewith at its upper and lower ends, a fan arranged within the lower portion of the separating-chamber, and a feeder arranged within the separating-chamber above the fan, whereby the material to be separated encounters in its descent from the feeder an upward air-current of gradually increasing force and the air is returned to the lower end of the separating-chamber after having deposited the dust in the surrounding dust-collector, substantially as set forth.

2. The combination, with the inclosing dust-collector, of a downwardly-tapering separating-chamber arranged within the dust-collector and communicating therewith at its upper and lower ends, a fan arranged within the lower contracted portion of the separating-chamber, and a feeder arranged within the separating-chamber above the fan, whereby an air-current is caused to flow upwardly through the separating-chamber with decreasing force and is returned to the lower contracted end of the separating-chamber after having deposited the dust in the dust-collector, substantially as set forth.

3. The combination, with the dust-collector, of an open-topped separating-chamber arranged within the dust-collector and made adjustable toward and from the top of the dust-collector, whereby the force of the air-current can be regulated, substantially as set forth.

4. The combination, with the dust-collector, of an open-topped separating-chamber suspended from the top of the dust-collector by adjustable bolts, substantially as set forth.

5. The combination, with the separating-chamber, of a fan arranged within the lower portion thereof, a fan-casing surrounding the fan and separated from the wall of the separating-chamber by a passage through which the heavy material descends, and an inclosing dust-collector communicating with the upper and lower ends of the separating-chamber, substantially as set forth.

6. The combination, with the dust-collector, of a separating-chamber arranged within the dust-collector, a fan arranged within the lower portion of the separating-chamber, a casing surrounding the fan and separated from the separating-chamber by a passage through which the heavy material descends, and a receiving-hopper arranged within the dust-collector below the separating-chamber, substantially as set forth.

Witness my hand this 20th day of October, 1890.

ORVILLE M. MORSE.

Witnesses:
CARRIE A. MUNDY,
JNO. G. MUNDY.